UNITED STATES PATENT OFFICE.

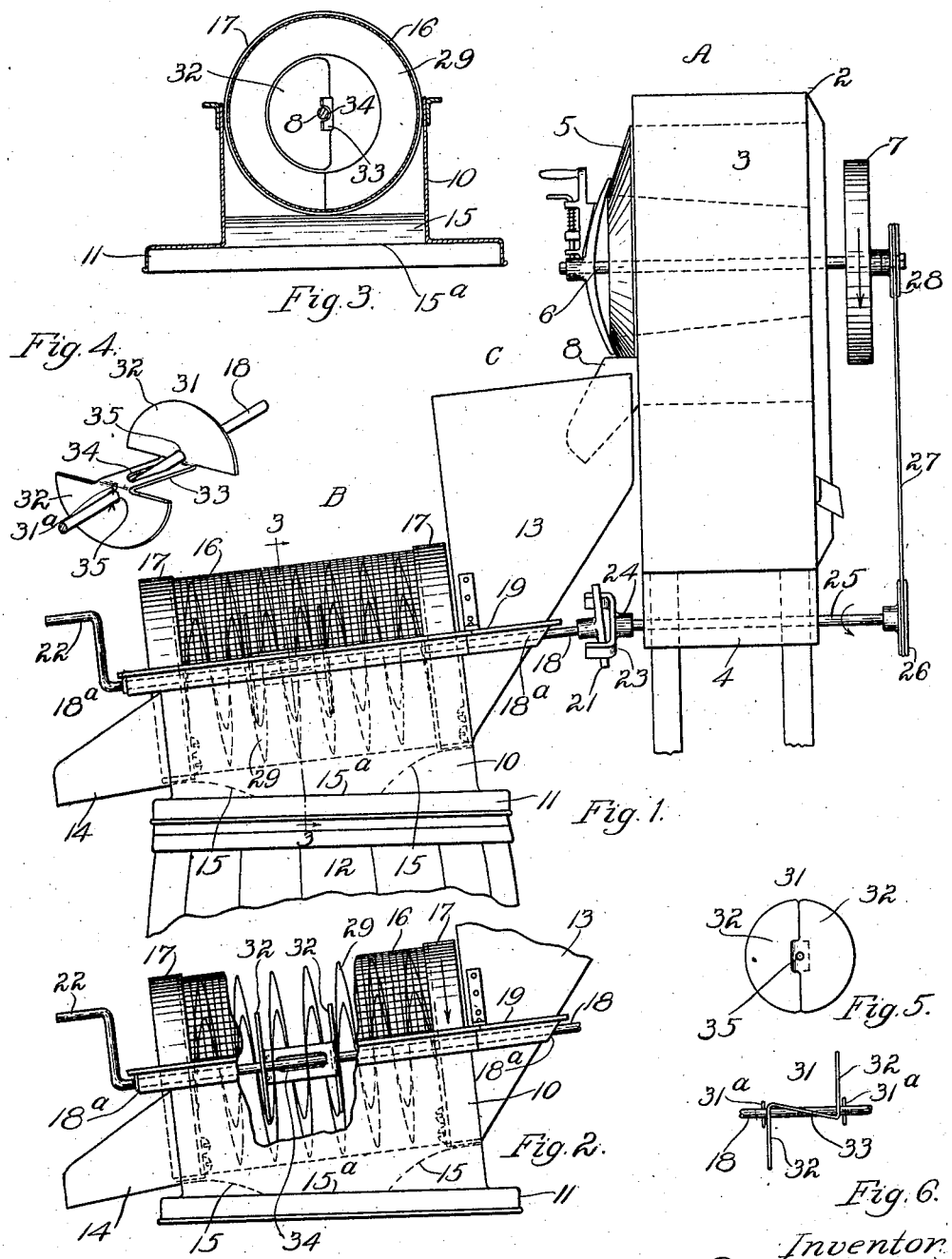

EUSTACE R. KNOTT, OF SHARON, MASSACHUSETTS.

POPCORN-SIFTING MACHINE.

1,395,715.　　　　　Specification of Letters Patent.　　Patented Nov. 1, 1921.

Application filed December 28, 1916. Serial No. 139,383.

*To all whom it may concern:*

Be it known that I, EUSTACE R. KNOTT, a citizen of the United States, residing at Sharon, in the county of Norfolk, State of Massachusetts, have invented a certain new and useful Improvement in Popcorn-Sifting Machines, of which the following is a specification, reference being had therein to the accompanying drawings.

This invention generally speaking, is a pop-corn sifting machine of novel and improved character and construction.

In the process of popping corn a small percentage of the kernels fails to expand or pop, and some thereof open only partially. Unless they are separated from the popped kernels, the unpopped or only partially opened kernels will be contained in the confection into which the popped corn is made, which is undesirable.

The main object of the present invention is to provide improved means for sifting or screening corn after being popped, and separating the unpopped as well as the undersize popped kernels from the fully popped corn, so as to prevent the hard unpopped and partially popped kernels from being contained in the manufactured confection.

A more specific object of the present invention is to provide an improved and efficient sifter for pop-corn, or such other material as it may be desired to sift or screen, requiring only a small amount of power for the actuation thereof, and adapted in novel manner to control the movement of the popcorn along the screen and provide for turning over or tumbling the pop-corn relative to the screen so as to insure full opportunity for all unpopped or partially opened kernels to escape through the openings of the screen, whereby to insure the effectual separation of the undesirable from the desirable material.

I attain the objects of the invention by providing a rotary cylindrical screen with means, hereinafter termed barrier means, by which the material is controlled, directed, and turned over or tumbled during its travel along the screen; and further by providing a so-called baffle-device by means of which kernels entering at one end of a central passageway through a cylindrical screen are intercepted and caused to land upon an intermediate portion of the screen.

The foregoing, and other objects and features of the invention which will hereinafter appear, will be understood readily in the light of the following description.

An illustrative embodiment of the features of the invention is illustrated in the accompanying drawings, in which,—

Figure 1 is a side elevation of a cornpopper and of a sifting machine comprising the said embodiment, with the popper and the sifter disposed in working relations and operatively combined.

Fig. 2 is a side elevation of the sifting machine with portions of the casing and screen thereof removed to show the internal parts more clearly, and a portion of the receiving chute broken away.

Fig. 3 is a view of the sifting machine or sifter in cross-section on line 3—3 of Fig. 1.

Fig. 4 is a perspective view of the central baffle-device and the portion of the screen shaft upon which such device is mounted.

Fig. 5 is an end elevation of the baffle, and

Fig. 6 is a view of the parts that are shown in Fig. 4, looking from above in Figs. 1 and 2.

The combined machine that is shown in Fig. 1 comprises, as its general elements, the corn-popper or popping machine A, the sifter B, means at C for transferring the popped corn from the popper A to the sifter B, and a driving train connecting with the popper and the sifter and serving to actuate the moving elements thereof.

The popper A is in this instance of a well-known type, it comprising an exterior casing 3 mounted on a suitable support or stand 4 and having arranged in its upper portion a horizontal rotary popper cylinder 5, shown partly in dotted lines, beneath which in practice a suitable burner, not shown is disposed. The cylinder 5 is adapted to be coupled by known means, not necessary to be described, to a shaft 6 which extends lengthwise through the cylinder and is provided with a driving pulley 7 connectible to any suitable source of power for rotating the cylinder 5. The cylinder 5 is constructed with an open forward end from which the popped kernels discharge automatically into a discharge chute 8 arranged on the casing 3.

The sifter B, designed to screen the popped corn, is furnished with a suitably shaped housing or casing 10 adapted to be mounted upon any suitable support. In this instance the said housing or casing is shown as provided with an annular downturned flange 11 so that it may be fitted like a cover upon the top of a receptacle or barrel 12, the upper portion of which is shown in Fig. 1. The sifter-housing 10 carries at one end thereof the transferrer, which in this instance is an upwardly extending hopper 13. When the sifter is arranged in working relations with a popper, as in Fig. 1, the hopper 13 is in position to receive the corn which discharges from the popper through the chute 8. The hopper 13 is arranged to deliver the corn into the interior of the screen of the sifter. The sifter-housing 10 is furnished at the end or side opposite that at which hopper 13 is located with a trough 14 into which the popped corn passes from the screen, and by which such corn is discharged into any convenient receptacle. Intermediately between the receiving hopper 13 and the discharge chute 14 the sifter-housing 10 is provided with bottom plates 15, 15, inclined downwardly toward each other, with an opening 15$^a$ between them leading to the interior of barrel 12. The sifter-housing 10 is designed and arranged to provide support for a rotating cylindrical screen 16 formed of suitable sifting material. The ends of the screen are secured in head rings 17, 17, appropriately connected to a central longitudinally extending shaft 18, which is journaled in bearings provided at 18$^a$, 18$^a$, in connection with a rectangular frame 19 attached to the top of the housing. The cylindrical screen 16 with its shaft 18 is supported with its longitudinal axis inclined upward toward the receiving end of the screen. In the illustrated mechanism, for convenience in driving the screen, the upper end of shaft 18 is extended through the receiving hopper 13 and is provided on its upper end with a diametrically extending dog or clutch-bar 21 for use in driving the sifter by power. At its lower end the shaft 18 is provided with a hand-crank 22 by which the sifter may be rotated manually when desired. The illustrated driving mechanism is so contrived that when the sifter as a whole is placed in working position with relation to the popper as in Fig. 1, namely so that its hopper 13 is disposed below the discharge chute 8 of the popper, the clutch-dog or cross-bar 21 of the screen-shaft 18 then occupies a position between the parallel arms of a yoke-shaped driving clutch-member 23 which is suitably secured on a shaft 25, the latter suitably mounted with respect to the housing 2 of the popper. Shaft 25 has upon it a pulley 26 which is connected by a belt or band 27 with a pulley 28 secured on the driving shaft 6. It will be apparent that when the clutch or coupling members 21, 23, are in engagement with each other as in Fig. 1, the rotative motion of the cylinder shaft 6 that is transmitted to the shaft 25 by means of pulley 28, driving band 27, and pulley 26, will be communicated by means of the clutch or coupling-members to the screen-shaft 18, so that the sifter-screen 16 will be driven as required.

There is provided within the cylindrical screen 16 means for controlling the flow of the corn lengthwise of the screen downward along the incline of the latter, and also insuring that all portions of the volume of corn within the screen shall be permitted to make contact with the screen surface.

This means comprises a succession of obstructions or barriers arranged to interrupt or prevent continuous flow of the corn downward along the incline from the receiving end of the screen to the discharging end thereof, and preferably extending transversely and concentrically of the screen, within the latter. In the present instance the obstructing or barrier means is shown as comprising a helix 29, of a suitable number of turns and of a suitable radial width, which is located within the screen, close to the cylindrical portion of the latter, and turns therewith. The space between successive turns of the said helix forms a substantially continuous spiral passage or pathway from one end of the cylinder to the other. The radial width of the strip of material composing the helix 29 is less than the radial distance between the shaft 18 and the inner surface of the screen 16, so as to leave a central passageway extending from one end of the cylinder to the other.

In practice, when the material to be screened is discharged into the hopper 13 of the sifter, some portion of the material may jump or be deflected too far or entirely through the central passageway within the helix 29, and it is desirable to prevent this so as to insure the subjection of all of the material to the sifting action, as well as to the predetermined extent of sifting action. To that end there is provided a baffle device adapted to effectually prevent the material from flying entirely through the said central passageway, and for arresting its flight at the desired point. This baffle device, shown at 31, preferably is supported in working position by being mounted upon the screen-shaft 18 at the center of the cylindrical screen. It is shown as comprising a piece of sheet metal formed at its opposite ends with semicircular deflectors 32, 32, the radius of each of which is substantially equal to the distance between the shaft 18 and the inner edge of the helix 29. The semicircular or segmental deflectors 32, 32, are connected between their diametrical edges by a longitudinal shank 33 of suitable width and length, which is provided with a central longitudinal slot or perforation 34 wide enough to receive the shaft 18. The deflectors, or it might be right-angled portions of the shank 33, have formed therein two circular apertures 35, 35, of a diameter corresponding substantially with the diameter of the screen-shaft 18. The semicircular deflectors 32, 32, extend outward in diametrically opposite directions at the opposite ends of the shank 33 so as to stand relatively axially spaced, as clearly shown in Figs. 4 and 6, to permit the circuitous passage of the material along the screen in movement from the turns of the helix intervening between the axially spaced semicircular barriers 32, 32. The aggregate area of these barriers, standing substantially at right angles to the length of the shank 33, forms a circular closure against the direct passage of any deflected pieces or kernels of the pop-corn through the central cylindrical aperture in the helix. The proper position of the baffle 31 on the shaft 18, lengthwise of the latter, may be determined by cotter-pins 31$^a$, 31$^a$, Figs. 4 and 6.

The operation of the combined machine shown in the drawings is substantially as follows: As the popped corn issues from the popper cylinder 5 it falls into the discharge chute 8 and thence into the hopper 13, whence it is directed into the open end of the rotating cylinder 16.

While the cylinder 16 may be rotated in either direction to effectually operate to screen the popped corn as it is continuously fed into the hopper 13, in the present adaptation the screen 16 is so driven by the belt 27 of the connecting means that the helix 29 of the screen tends to feed the material uphill as regards the inclination of the screen. This results in effectually agitating and tumbling the material as it is fed to the screen so that the unpopped kernels and the under-sized popped grains will have ample time to reach the surface of, and be sifted through, the screen 16. When rotating in such direction as to tend to back the material uphill, relatively, the popped corn will accumulate to a depth along the bottom of the cylindrical inclined screen substantially equal to the radial width of the helix and will thereafter be showered over the inner edge of the helix into the next lower portion of the spiral path during the tumbling action owing to the rotation and inclined position of the screen. Any hard or unpopped kernels which strike the inclined wall of the hopper 13 and tend to fly directly through the central passageway within the inner edge of the helix 29 will be impeded in their movement by the relatively offset segmental members 32 of the baffle 31, and thus caused to fall into the space between the turns of the helix and be subjected to a sifting action. The under-sized and unpopped kernels will pass through the apertures of the cylindrical screen 16 and through the waste opening 15$^a$ in the bottom of the housing 10 and be collected in the receptacle or barrel 12, while the desirable portions of the material will pass out of the discharge end of the screen 16 into a suitable receiver which may be positioned beneath the discharge member 14.

The cylindrical screen 16 does not become clogged because the pop-corn kernels, by virtue of the rotation of the screen, are constantly loosened from the screening surface and thus the screen is, in action, self-clearing.

The clutch or coupling 21, 23, has the triple functions of serving as simple means for the ready coupling or separation of the sifter with relation to the corn-popper; also by its construction permits the efficient operation of the shaft 25 and the inclined shaft 18 by the allowance for angular play between the coöperative elements 21, 23, incident to their angular relations, and provides for the simultaneous operation of the popper cylinder and the moving sifter member. By simply crossing the belt 27 the screen 16 may be rotated in a direction to cause the spiral to feed the pop-corn down-hill with a slow tumbling, retarded motion. The machine works efficiently with a thorough tumbling and progressing action on the popped corn and without breaking or injuring it in any way.

It is understood that the sifter may be charged by hand or may be arranged for sifting the issue from any desired type of popper or other source.

I claim as my invention:—

1. A sifter comprising a revoluble, open-ended screen having an internal barrier forming a longitudinal central passageway, and a plurality of axially spaced segmental deflectors for interrupting the direct flow through the passageway of the material being screened.

2. A sifter comprising a revoluble screen, an internal barrier forming spaces in the screen and having a central passageway, a shaft extending axially through the passageway, and a baffle mounted on the shaft and having axially spaced segmental deflectors for interrupting passage of the material through the passageway and directing it into the spaces between the barrier.

In testimony whereof I affix my signature in presence of two witnesses.

EUSTACE R. KNOTT.

Witnesses:
  CHAS. F. RANDALL,
  ELLEN O. SPRING.